United States Patent [19]

Arzberger et al.

[11] 4,139,125
[45] Feb. 13, 1979

[54] RECONSTITUTED FOOD DISPENSER

[75] Inventors: William A. Arzberger, Medfield; Edward J. La Lumiere, Woburn, both of Mass.

[73] Assignee: Jet Spray Cooler, Inc., Waltham, Mass.

[21] Appl. No.: 826,071

[22] Filed: Aug. 19, 1977

Related U.S. Application Data

[63] Continuation of Ser. No. 659,021, Feb. 18, 1976, abandoned.

[51] Int. Cl.² ............................................. B67D 5/62
[52] U.S. Cl. ......................... 222/129.4; 222/146 HE; 222/460; 222/564
[58] Field of Search ........ 222/146 R, 146 H, 146 HE, 222/129.4, 460, 461, 564

[56] References Cited

U.S. PATENT DOCUMENTS

| | | | |
|---|---|---|---|
| 2,653,733 | 9/1953 | Rudd et al. | 222/460 X |
| 2,770,396 | 11/1956 | Vernig | 222/146 H |
| 2,939,614 | 6/1960 | Hill | 222/460 X |
| 3,822,810 | 7/1974 | Fugua | 222/146 HE |

FOREIGN PATENT DOCUMENTS 1226814 10/1966 Fed. Rep. of Germany ........ 222/129.4

Primary Examiner—David A. Scherbel
Attorney, Agent, or Firm—Wolf, Greenfield & Sacks

[57] ABSTRACT

A reconstituted food dispenser for such foods as cereal, mashed potatoes and the like wherein a housing is provided having a platform on which is supported a container has a discharge opening on which a metal block is tainer has a discharge opening on wich a metal block is mounted, and the metal block in turn has a passage which communicates with the discharge opening. A second passage is also provided in the block, which receives hot air from a tube in the housing. A funnel mounted on the housing immediately below the discharge end of the passage in the block receives hot water from a water heater in the housing and receives the reconstitutable food from the container, and the two are mixed and discharged from the funnel. The food may be in the form of flakes, granules, powder, etc.

2 Claims, 4 Drawing Figures

RECONSTITUTED FOOD DISPENSER

RELATED APPLICATION

This application is a continuation of applicants' application Ser. No. 659,021, filed Feb. 18, 1976, now abandoned.

INTRODUCTION AND BACKGROUND

This invention relates to food dispensers and more particularly comprises a dispenser particularly designed to dispense instant foods such as hot cereal, mashed potatoes, and other similar products made by mixing hot water and the food in dehydrated form.

At the present time there are dispensers on the market designed to reconstitute and dispense such items as mashed potatoes made from a mixture of hot water and the food in dehydrated form. There is a demand for an improved machine of that type as well as for machines capable of dispensing oatmeal, hominy grits, etc. made by reconstituting food flakes, powder or granules. There are a number of problems involved in the design of such dispensers. For example, the flakes are extremely sticky and tend to clog any passages through which they must flow before being thoroughly mixed with water to reconstitute them. So-called whiskers grow at the discharge passages, which create difficulties in maintaining sanitation standards. Furthermore, the dry food flies about the discharge passage of the containers holding it, and the updraft caused by rising steam from the hot water in the system tends to spread the dust about and soil the equipment. In order to clean the dispensers thoroughly, they must be capable of being disassembled, and obviously if the machines are to gain acceptance by the industry, they must be easy to dissemble. In the prior art, the presence of impellers in the mixing chambers which serve as blenders to thoroughly mix the water and dried food, makes disassembling of the machines difficult.

In accordance with the preferred form of the present invention, there is no impeller or other moving element in the mixing chamber which requires disassembling or which in any way interferes with cleaning. In addition, a special heating system is provided that keeps the discharge opening dry, prevents whisker growth and sanitizes the area heated by it. Also in accordance with this invention, a baffle is provided which prevents steam that rises from the mixing chamber, from coming in contact with the container holding the dehydrated food. A special baffle and vent arrangement diverts the steam from the container.

One important object of this invention is to provide a dispenser for cereal, mashed potatoes and the like which is very easy to disassemble and clean.

Another important object of this invention is to provide a food dispenser having a heated block over the discharge opening of the food container, which prevents the dehydrated food flakes, powder or granules from caking at the container opening.

Yet another important object of this invention is to prohibit steam from coming in contact with the container of the dehydrated food.

These and others and features of this invention will be better understood and appreciated from the following detailed description of one embodiment thereof, selected for purposes of illustration and shown in the accompanying drawing.

BRIEF FIGURE DESCRIPTION

DETAILED DESCRIPTION

Figure 1:
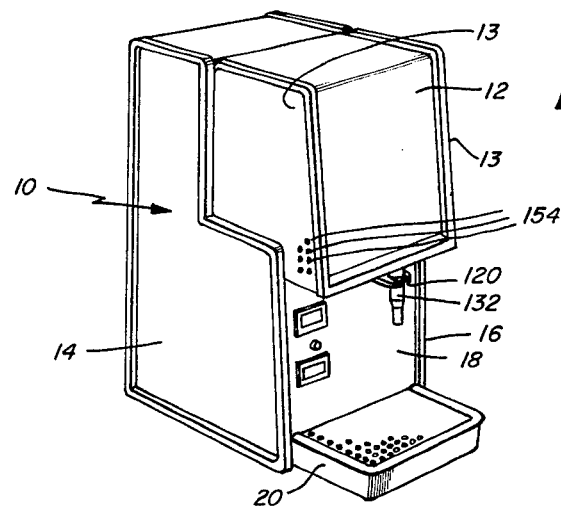
FIG. 1 is a perspective view of a dispenser constructed in accordance with this invention.
Figure 2:
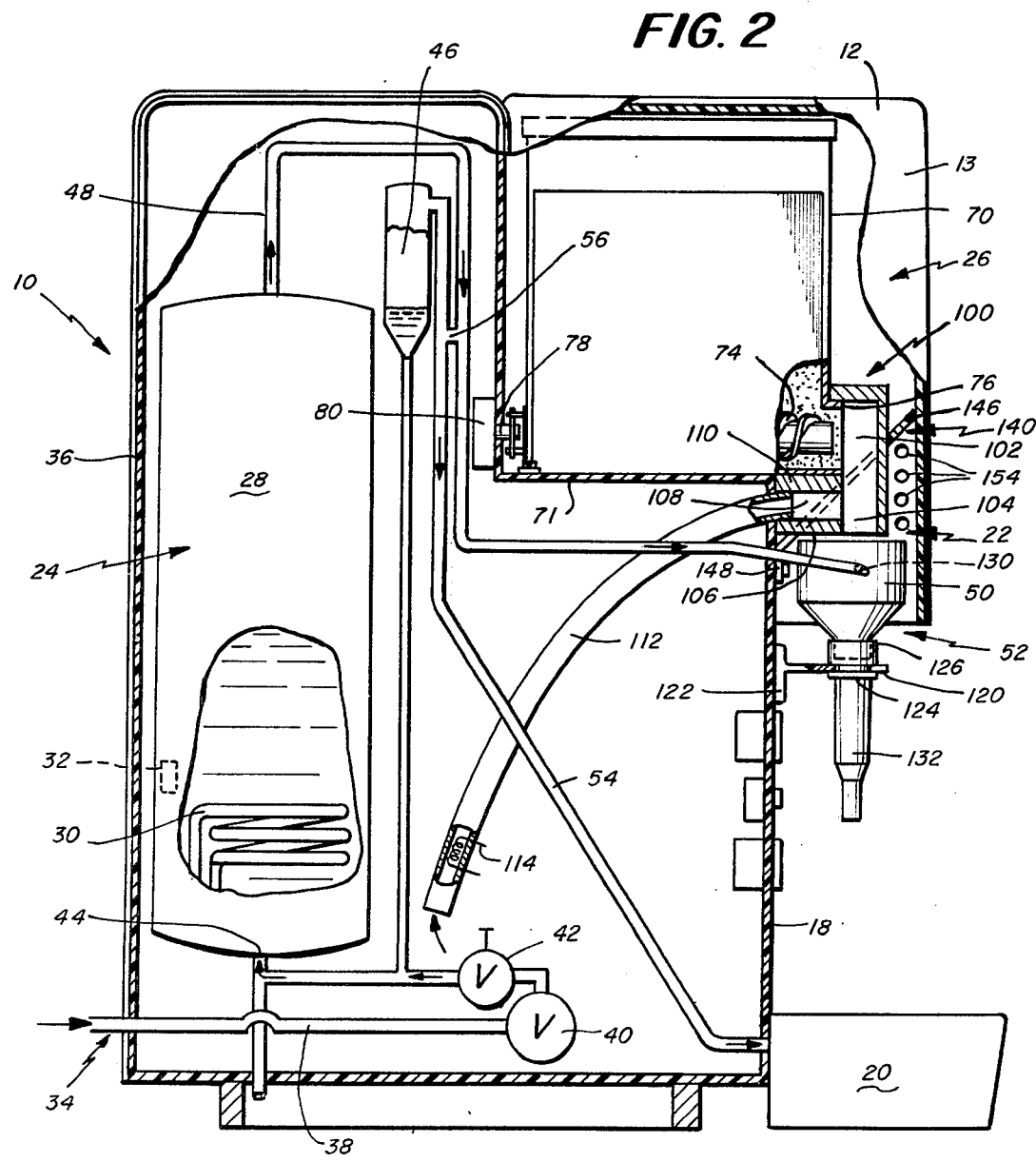
FIG. 2 is a side view of the dispenser shown in FIG. 1 with a side panel removed and with parts of the interior structure in cross section.

The dispenser shown in the drawings includes a housing 10 having a removable hood 12, side panels 14 and 16, front panel 18, drip tray 20 and discharge assembly 22. The dispenser also includes a hot water system 24 and a food concentrate supply system 26. The hot water and food concentrate supply systems 24 and 26 are shown in FIG. 2. The hot water system may be substantially identical to that shown in co-pending application Ser. No. 564,772 filed Apr. 3, 1975 issued Apr. 5, 1977 as U.S. Pat. No. 4,015,749 entitled HOT COFFEE DISPENSER and assigned to the assignee of this application. Because the hot water system per se is not new to the present application, it is described only briefly below.

The hot water supply system 24 includes a heating tank 28 which preferably holds a gallon or more of water, and within which are immersed heating coils 30. A thermostat 32 is also present which controls the water temperature. Hot water tank 28 is supplied with water through a system of ducts which are schemmatically represented. Briefly, the ducting system includes a fitting 34 located on rear panel 36 and which may be connected to a constant pressure water line. The fitting 34 is in turn connected to duct 38 which is connected to the bottom of the tank at 44 and is interrupted by solenoid valve 40 and manually controlled valve 42. An expansion reservoir 46 is connected to duct 38 between the valve 42 and the inlet 44 to the tank. Hot water is discharged from the tank 28 through duct 48 connected to the top of the tank. Duct 48 exits through the front panel 18 of housing 10 and tangentially enters the mixing chamber 50 of funnel 52 that forms part of the discharge assembly 22. An overflow and vent duct 54 is connected to the top of expansion chamber 46 and also exits through the front panel 18 above drip tray 29. A bypass 56 connects ducts 48 and 54.

Figure 3:
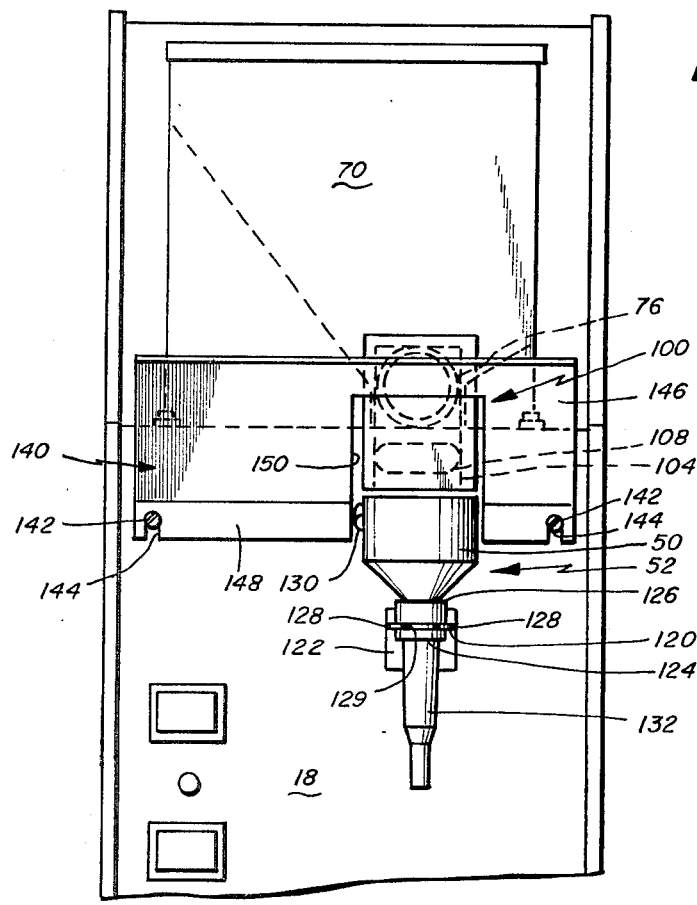
FIG. 3 is a fragmentary front elevation view of the dispenser shown in FIGS. 1 and 2 with the hood removed.

The dehydrated food, typically in the form of flakes, powder or granules is contained in hopper 70 which is supported on shelf 71 above front panel 18. The hopper is formed with a trough in the bottom which contains auger 74 used to propel the food particles through the opening 76 in the front of hopper 70. The hopper may or may not include baffles on the bottom wall which converge toward the trough so as to cause the flakes to flow in the direction of the trough into the path of the auger blades as suggested by the broken line shown in FIG. 3. The auger is driven through coupling 78 by motor 80.

Figure 4:
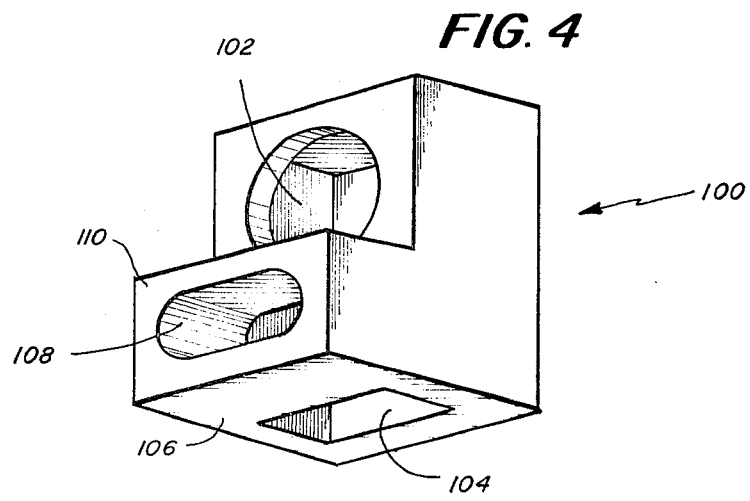
FIG. 4 is a perspective view of a detail of the dispenser.

A cover or block 100 in the form of an aluminum block is mounted with its inlet 101 surrounding opening 76 in the hopper 70. The block is rectangular and has a passage 102 that extends vertically from the opening 76 and inlet 101, and passage 102 terminates in a discharge port 104 in its lower surface 106. A second passage 108 extends horizontally from passage 102 to the rear surface 110 of the block. The passages 102 and 108 are in direct communication with one another as is evident in FIGS. 2 and 4. A heat pipe 112 extends upwardly through front panel 18. The upper end of the pipe 112 terminates within passage 108 in block 100. A heater 114 mounted in the tube adjacent its bottom heats the air in the tube. The heater creates a natural draft in tube 112 causing air at a highly elevated temperature to discharge into cover 100. Because the cover 100 is made of aluminum or some other highly heat conductive metal, the hot air entering the cover quickly elevates the temperature of the entire member so as to maintain the elevated temperature at discharge opening 76. The hot air at a temperature of 200° F. or more entering the cover prevents whiskers from forming at outlet 76 of hopper 70, caking is avoided, and the area adjacent the outlet 76 and cover is sanitized.

The funnel 52 is shown in FIG. 2 supported on a bracket 120 having a plate 122 mounted on the front panel 18 of the dispenser. A pair of flanges 124 and 126 are formed as part of the funnel 52 which snugly engage the top and bottom of bracket arms 128 that defined mounting slot 129 so that the funnel is releasably supported in place. Therefore, it may readily be slipped off the bracket for cleaning. Obviously, other arrangements may be employed to support the funnel. It is however important that one mounting means be easy to clean.

The mixing chamber 50 of funnel 52 is immediately below the discharge port 104 of passage 102 in cover 100. Consequently, the powder, granules or flakes of dehydrated food discharged from hopper 70 by auger 74 drops through passage 102 into the mixing chamber 50. The food particles are carried with the water which enters the chamber 50 tangentially at 130 as suggested in FIG. 2 and discharges through funnel tube 132 into the container (not shown) placed on the drip tray 20 beneath the funnel.

Hood 12 as viewed in FIG. 2 encloses hopper 70, cover 100, and a substantial portion of funnel 52. A baffle 140 is mounted on the top of front panel 18 by a number of screws 142 which register with slots 144 in the lower edge of the baffle. It will be noted in FIGS. 2 and 3 that the baffle has an upwardly and forwardly extending main section 146 and a short vertical section 148, the short section 148 resting against the front panel 18 and containing the slots 144. A large slot 150 which receives cover 100 and serves to retain the cover in place when the baffle itself is mounted on the panel 18. It is evident that the cover 100 which slips over the outlet 76 of hopper 70 is captured in slot 150 and cannot be removed unless the baffle is first removed. The baffle principally prevents steam in the mixing chamber 50 of the funnel rising under the hood from coming in contact with hopper 70. The steam which rises from the mixing chamber exits through the vent openings 154 provided in the sides 13 of hood 12.

From the foregoing description, it will be appreciated that such parts of the dispenser as hood 12, cover 100, baffle 140, funnel 52 and hopper 70 may quickly and easily be removed for cleaning, without the use of any special tools. And there are no crevices or traps or other inaccessible areas which cannot readily be cleaned. The funnel 52 and cover 100 may be quickly removed from the unit for washing. And the absence of an impeller or other mixing device in the funnel makes cleaning easier.

A reading of the foregoing description by those skilled in the art will suggest modifications that may be made of single embodiment of this invention illustrated and described. Therefore, the scope of this invention is not to be limited to the embodiment illustrated. Rather, its scope is to be determined by the appended claims and their equivalents.

What is claimed is:

1. A food dispenser comprising,
   a housing,
   a platform on the housing and a food container mounted on the platform,
   a discharge opening forming part of the container,
   a cover formed of highly heat conductive metal mounted on the discharge opening and having a first passage therein in communication with the opening as a continuation thereof, said passage having a discharge port,
   a second passage in the cover in communication with the first passage,
   a hot air tube in the housing and having a discharge end connected to the second passage in the cover for directing hot air into the cover,
   a funnel mounted on the housing having an enlarged inlet chamber disposed immediately below the discharge port and a discharge tube extending from the chamber,
   a hot water tube in the housing having a discharge end connected to the funnel inlet chamber,
   means removably mounting both the cover and funnel on the housing to permit quick access to said cover and funnel for ease of cleaning,
   a hood attached to the housing and covering the food container,
   means including a hot water tank in the housing for feeding hot water to the hot water tube,
   a baffle under the hood for preventing steam from rising from the funnel inlet chamber about the container,
   and vent holes in the hood below the baffle enabling steam to escape from the hood.

2. A food dispenser comprising,
   a housing,
   a platform on the housing and a food container mounted on the platform,
   a discharge opening forming part of the container,
   a cover formed of highly heat conductive metal mounted on the discharge opening and having a first passage therein in communication with the opening as a continuation thereof, said passage having a discharge port,
   a second passage in the cover in communication with the first passage,
   a hot air tube in the housing and having a discharge end connected to the second passage in the cover for directing hot air into the cover,
   a funnel mounted on the housing having an enlarged inlet chamber disposed immediately below the discharge port and a discharge tube extending downwardly from the chamber,
   a hot water tube in the housing having a discharge end connected to the funnel inlet chamber,
   means removably mounting both the cover and funnel on the housing to permit quick access to said cover and funnel for ease of cleaning,
   a hood attached to the housing and covering the food container,
   means including a hot water tank in the housing for feeding hot water to the hot water tube,
   and a baffle under the hood for preventing steam from rising from the funnel inlet chamber about the container.

* * * * *

UNITED STATES PATENT OFFICE
CERTIFICATE OF CORRECTION

Patent No. 4,139,125      Dated Feb. 13, 1979

Inventor(s) William A. Arzberger and Edward J. LaLumiere

It is certified that error appears in the above-identified patent and that said Letters Patent are hereby corrected as shown below:

In the ABSTRACT, cancel the fourth line and substitute --tainer of the food in a reconstitutable form. The con- --; in line 5, correct the spelling of "wich" to read --which--.

Column 1; line 36, cancel "dissemble" and substitute --disassemble--.

Column 2, lines 34,35, correct the spelling of "schemmatically" to read -- schematically--.

Column 3; line 22, correct "defined" to read --define--.

Signed and Sealed this

Fourth Day of December 1979

[SEAL]

Attest:

SIDNEY A. DIAMOND

Attesting Officer      Commissioner of Patents and Trademarks